Jan. 26, 1965 R. P. FOERSTER 3,167,726

VOLTAGE CONTROLLED, VARIABLE FREQUENCY OSCILLATOR

Filed March 25, 1960 3 Sheets-Sheet 1

*INVENTOR.*
ROY P. FOERSTER
*BY* Earl C. Hancock
AGENT.

INVENTOR.
ROY P. FOERSTER.
BY
Earl C. Hancock
AGENT.

VOLTAGE CONTROLLED, VARIABLE FREQUENCY OSCILLATOR

Filed March 25, 1960 3 Sheets-Sheet 3

*INVENTOR.*
ROY P. FOERSTER.
*BY*
Earl C. Hancock
AGENT.

3,167,726
Patented Jan. 26, 1965

3,167,726
VOLTAGE CONTROLLED, VARIABLE FREQUENCY OSCILLATOR

Roy P. Foerster, Baltimore, Md., assignor to Martin-Marietta Corporation, a corporation of Maryland Filed Mar. 25, 1960, Ser. No. 17,690
11 Claims. (Cl. 332—16)

Figure 1:
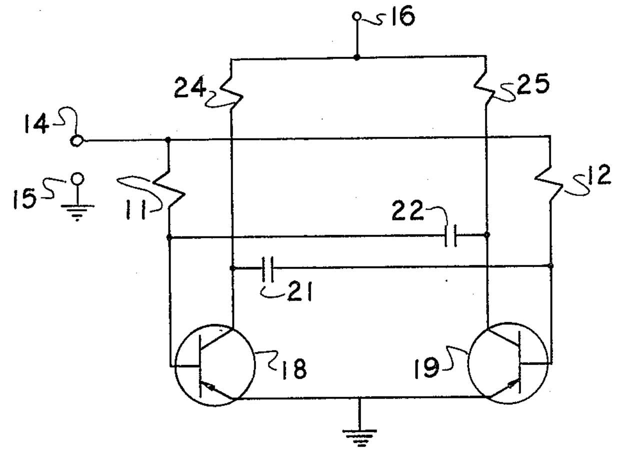
FIG. 1. PRIOR ART

This invention relates to oscillators having the output frequency thereof linearly controlled by an input voltage and more particularly to transistor oscillators wherein the frequency of output signals therefrom is a direct and linear representation of the level of an input voltage thereto over a wide dynamic range.

It is often necessary to convert an input voltage into an oscillating output voltage and to be able to maintain the frequency of this output voltage in direct relation to the level of the input signal. For instance, the output voltage of condition monitoring equipment in aircraft and missiles often is a varying D.C. potential that is an indication of the status of the condition being monitored such as temperature, strain, acceleration, pressure, and power levels, for example. This D.C. potential is generally not suitable for modulating the output of a telemetering transmitter, and therefore the D.C. potential information must somehow be converted into a suitable modulating form. In the past, this information has been converted by any of a number of schemes such as by using a constant modulating frequency and controlling either the percent modulation or the output power level with the D.C. potential, sequentially integrating the D.C. potential and using this to control a pulse position modulation system, frequency modulating, and the like but each of these systems generally depend upon vacuum tube circuitry and are therefore subject to inaccuracies resulting from variations in tube characteristics. In addition, the aforementioned telemetering systems often required the acceptance of such undesirable characteristics as complexity of configuration and the inherent weight, size and power penalties associated therewith.

The present invention provides an advantageous solution for the aforementioned problems by advantageously employing the properties of transistors to produce a compact, lightweight and stable oscillator that requires relatively little input power and which is capable of producing an output signal whose frequency is in direct, linear proportion to the D.C. input potential and is relatively independent of the parameters of the transistors used. The output signal that is thus produced by this invention is highly suitable for use in amplitude modulating a telemetering transmitter. Furthermore, this invention is not limited to telemetering applications since once its operating characteristics become known, one having normal skill in the art will readily recognize that there are a wide variety of applications for which this invention can be readily adapted such as for marker generators, computers, or integrators for example.

The present invention is basically an astable multivibrator somewhat similar to that shown on page 603 in the book entitled "Pulse and Digital Circuits," by J. Millman and H. Taub (McGraw-Hill, 1956), with the base circuit resistances thereof replaced by constant current generating means which, in turn, are returned to an input voltage instead of being returned through timing resistors to the power source. By this configuration, one of the timing capacitors will receive a charge approaching the voltage of the power source while the other timing capacitor will discharge at a linear rate determined by the output current from the constant current generator during any half cycle of the multivibrator operation. Thus by making the output current of the constant current generator directly proportional in amplitude to the input voltage, the output frequency of the multivibrator will also be controlled in direct proportion to the input voltage.

In one embodiment of the present invention, the constant current generator means are supplied by a pair of transistors each connected in ground base configuration with the input voltage connected to the emitters thereof so as to produce emitter currents equal to approximately one-half of the input current. Since the constant current transistors are in a grounded-base configuration, the input current will see an apparent ground potential at the emitter electrodes and thus will remain constant in proportion to the input voltage. Furthermore, this grounded-base configuration also will maintain the collector currents very nearly equal to the emitter current, regardless of the collector voltage. Thus during half of a cycle of multivibrator action, the constant collector current of one of the constant current transistors will linearly discharge the timing capacitor associated therewith while the other constant current transistors will provide base current flow for the conducting multivibrator transistors. The function of these transistors reverses, of course, each time one of the timing capacitors is discharged, and to this extent, the circuit follows the multivibrator operation that is well known in the art.

The range of output frequencies available from this invention can be materially increased by including another pair of transistors connected in an emitter-follower configuration so that the base-emitter circuits thereof are connected between a respective one of the timing capacitors and the collector of the multivibrator transistor associated therewith. By this arrangement, the resistance of the charging circuit for each of the timing capacitors can be reduced thus producing a smaller charging time constant for the multivibrator. Collector clamping and temperature stabilizing arrangements can also be employed to prevent the transistor drift currents and variations in supply voltage from effecting the operation of the circuit.

In addition, I have advantageously employed voltage-controlled oscillators such as are described hereinbefore to provide a system for producing an output signal that is proportional to the ratio of a pair of analogue input signals. In particular, this analogue divider comprises essentially a pair of channels each including a voltage-controlled oscillator, an inhibitor, and a binary counter circuit connected in series in that order. Each of these channels is connected to receive a different one of the two analogue input signals, convert this analogue signal into a signal having a frequency proportional to the analogue value in the oscillator, and then pass this converted signal through the inhibitor into the binary counter. The output count of the final counting stage of one of these channels (hereinafter referred to as the gating counter for purposes of description) is then coupled to the inhibitors to turn them "off" when the gating counter is full. The count that is then stored in the binary counter circuit of the other channel (hereinafter referred to as the summing counter) is an indication of the ratio of the two analogue quantities since the number of binary stages in the gating counter is known.

Figure 2:
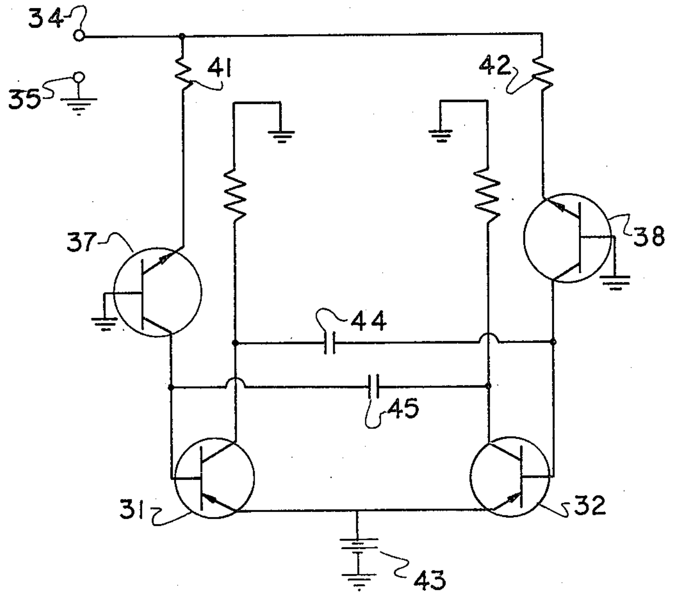
Figure 3:
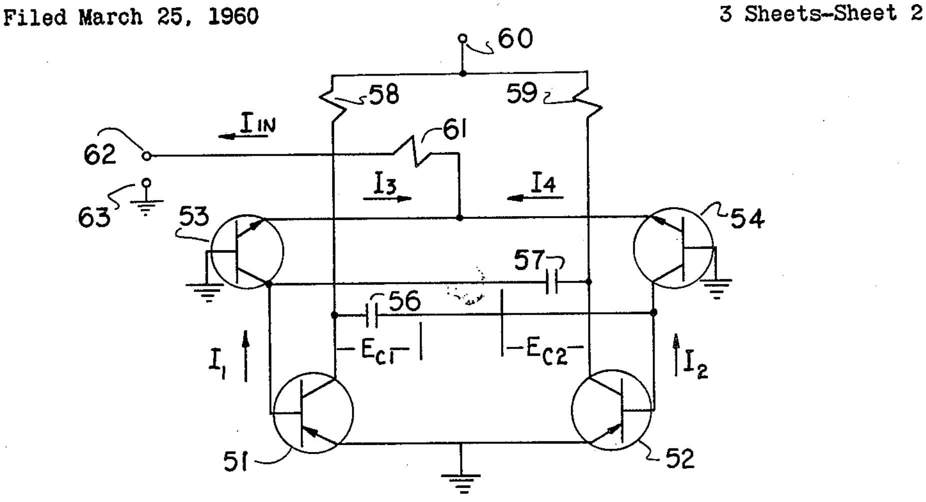
Figure 4:
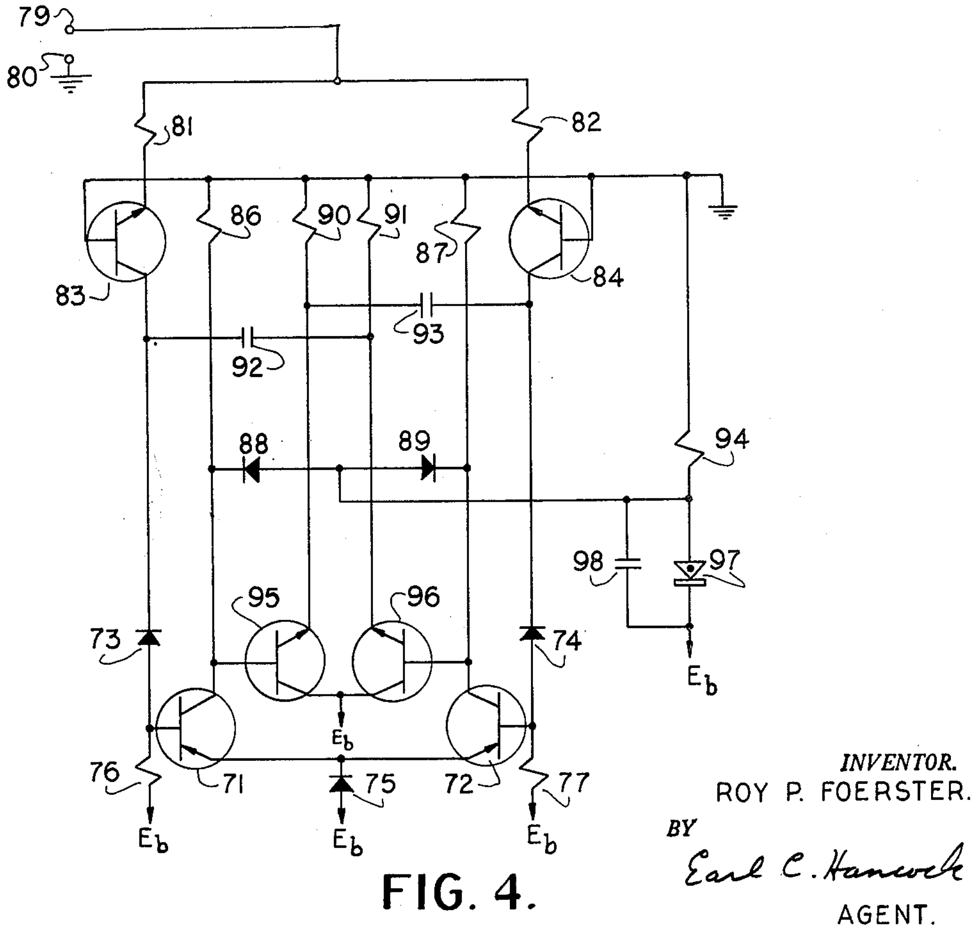
Figure 5:
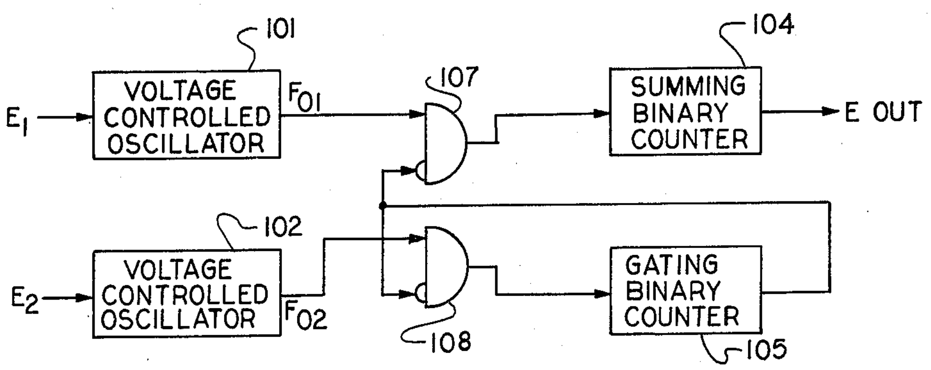
Figure 6:
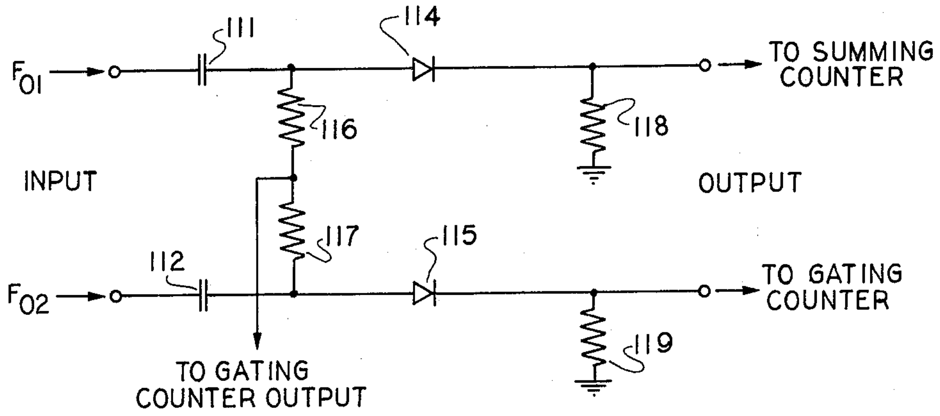

The novel features that are considered characteristic of this invention are set forth with particularity in the appended claims. The invention itself, however, both as to its organization and method of operation as well as additional features and advantages thereof will be best understood from the following description when read in connection with the accompanying drawings in which:

FIGURE 1 is a typical astable multivibrator according to the prior art including separate discharge paths for the timing capacitors thereof; and FIGURE 2 shows a multivibrator similar to FIGURE 1 modified in accordance with this invention; and FIGURE 3 shows another modification of the multivibrator circuit of FIGURE 1 in accordance with this invention and illustrating typical current flows therein for purposes of analysis; and FIGURE 4 is another circuit in accordance with this invention including circuitry for increasing the reliability and frequency range thereof; and FIGURE 5 is an analogue divider circuit advantageously utilizing voltage-controlled oscillators in accordance with this invention; and FIGURE 6 shows a typical circuit arrangement for the inhibitors of FIGURE 5.

FIGURE 1 illustrates a typical astable multivibrator in accordance with the prior art in which timing resistances 11 and 12 are returned to a negative input potential at terminals 14 and 15 instead of to the negative power source connected between terminal 16 and ground as is done in conventional multivibrator configurations. Multivibrator transistors 18 and 19, here illustrated as PNP type transistors, each have the collector output thereof returned to the base input of the other transistor by means of capacitive elements 21 and 22. The emitter electrodes of transistors 18 and 19 are returned to ground and the circuit is completed by collector load resistances 24 and 25.

For purposes of analysis, assume that transistor 18 is initially non-conducting, transistor 19 is conducting, and capacitor 21 has charged to the potential of the power source. As transistor 18 begins to conduct, the charge on capacitor 21 drives transistor 19 into a non-conducting state and the current from the base of 18 as a result of the input potential at terminals 14 and 15 holds transistor 18 in the conducting state. The collector of transistor 18 will now be at ground potential, and capacitor 21 will discharge through timing resistor 12. From the foregoing it can be seen that the transition time and thus the output frequency for this circuit is dependent upon the time required to discharge capacitors 21 and 22. However, the capacitor discharge current, $I_c$, is defined:

$$I_c=\frac{E_{in}}{R_s}e^{-\frac{T}{R_sC}}$$

where $E_{in}$ is the input voltage at terminals 14 and 15, $e$ is the natural logarithm base, $R_s$ is the resistance in series with the capacitor, T is time, and C is the value of the capacitance. It now follows that where the input voltage to FIGURE 1 is varied, the output frequency thereof can also be varied but only in exponential relation.

FIGURE 2 illustrates a circuit according to this invention wherein the discharge resistances for the capacitors of FIGURE 1 are replaced by high impedance, constant current sources. In particular, FIGURE 2 shows multivibrator transistors 31 and 32 having the base circuits thereof returned to the input potential at terminals 34 and 35 by means of transistors 37 and 38. These transistors are connected in grounded-base configurations and are coupled to sense the input voltage by means of resistors 41 and 42. Power source 43 supplies collector current for transistors 31 and 32 while collector current for transistors 37 and 38 is provided by the input voltage.

Perhaps a better understanding of this invention can be realized by considering the operation and analysis of FIGURE 3 which is essentially the same as FIGURE 2 with some modifications. In FIGURE 3, transistors 51 and 52 are the oscillator or multivibrator transistors, and transistors 53 and 54 are the constant current sources. Capacitors 56 and 57 are connected for providing timing feedback between oscillator transistors 51 and 52 as is well known for multivibrators. The emitters of transistors 51 and 52 are commonly connected to ground and the collector circuits thereof are coupled so as to be completed by load resistances 58 and 59 which are in turn connected to the negative potential of a power source at terminal 60. The emitters of transistors 53 and 54 are commonly connected and coupled to input terminals 62 and 63 by resistor 61. Since transistors 53 and 54 are connected in a common-base configuration, the emitters thereof are constantly at ground potential. Thus when a negative input voltage is introduced to terminals 62 and 63, it will be converted to an input current, $I_{in}$, which will be evenly divided between the emitters of transistors 53 and 54. Expressed mathematically:

$$I_{in}=\frac{E_{in}}{R_{61}} \quad (1)$$

and:

$$I_3=I_4=\tfrac{1}{2}\ I_{in} \quad (2)$$

The grounded-base configuration of transistors 53 and 54 further insures that the collector currents thereof will approximately equal to the emitter currents, and therefore:

$$I_3=I_4\cong I_1\cong I_2\cong\tfrac{1}{2}I_{in}=\frac{E_{in}}{2R_{61}} \quad (3)$$

During the multivibrator action, transistors 51 and 52 act as switches in that they are driven hard enough to be fully conducting to appear as short circuits wherein the emitter voltage and the collector voltage are equal, or they are fully non-conducting so as to appear as open circuits between collectors and emitters.

Assume at a time $T=0$ that transistor 51 has just turned "on" and that capacitor 56 has been previously charged to the supply voltage, $E_b$, by resistor 58 so that $E_{c1}=E_b$. Then as transistor 51 turns "on," the charge on capacitor 56 causes the base of transistor 52 to be driven in the "off" direction. Current $I_1$ now holds transistor 51 in the "on" condition and the timing cycle begins.

Capacitor 56 will be discharged by $I_2$ through the emitter-base circuit of transistor 54 at a rate determined by the input voltage, $E_{in}$, in accordance with Equation 3. From this it can be seen that $I_2$ will remain constant for a constant $E_{in}$. At a later time T1, the charge on capacitor 56 will be reduced to zero and transistor 52 will again be driven into conduction. This will occur at:

$$T1=\frac{C_{56}\times E_{c1}}{I_2} \quad (4)$$

During the interval between $T=0$ and T1, the emitter-base diode of transistor 51 has clamped one side of capacitor 57 to ground, and since transistor 52 is "off," resistor 59 has charged to the supply voltage ($E_{c2}=E_b$). Since capacitors 56 and 57 must always charge to a fixed voltage, circuit values are arranged so that time constants $R_{58}\times C_{56}$ and $R_{59}\times C_{57}$ are much less than the desired minimum period of oscillation or the maximum operating frequency, $F_{max}$. That is:

$$R_{58}\times C_{56}=R_{59}\times C_{57}\ll\frac{1}{F_{max}} \quad (5)$$

As transistor 52 turns "on" at time T1, the timing cycle is one half completed. During the next half of the timing cycle, the roles of transistors 51 and 52 capacitors 56 and 57, $I_1$ and $I_2$ and resistors 58 and 59 are reversed, but essentially the circuit operation is the same as during the first half.

Referring to Equations 1, 3, and 4 which cover one half cycle of circuit operation, the frequency of oscillation for this circuit, $f$, becomes:

$$f=\frac{E_{in}}{4E_bR_{61}C} \quad (6)$$

where: $C=C_1=C_2$

From this it can been seen that the frequency of oscillation for this circuit is a direct and linear function of the input voltage, $E_{in}$.

FIGURE 4 illustrates a circuit in accordance with this invention wherein some of the possible modifications for improving the reliability and frequency range are included.

In particular, multivibrator or oscillator transistors 71 and 72 generally have leakage currents that vary with temperature variations. To prevent these leakage currents from combining with $I_1$ and $I_2$ and thus making the oscillator unstable with temperature, diodes 73 and 74 are incorporated to isolate the timing circuit from the leakage currents. Resistors 76 and 77 shunt these leakage currents through the power supply $E_b$ and thence to ground thereby preventing them from affecting the circuit operation. Diode 75 is also included in the emitter circuits of transistors 71 and 72 to provide inverse-biasing to prevent thermal run-away and thereby provide additional temperature stabilization.

The negative input signals are introduced at input terminals 79 and 80 and are subsequently coupled into transistors 83 and 84 by means of resistors 81 and 82. Each of these two resistors is equal to twice the value of resistance of a common resistance which could be used in their place if desired. However, using separate resistances has the advantage of making it possible to balance the input characteristics of transistors 83 and 84 thereby insuring that $I_1$ and $I_2$ will be nearly equal.

The minimum input voltage at which the circuit will operate is determined by the minimum current required to turn transistors 71 and 72 "on" and "off." Therefore, collector resistors 86 and 87 should be large but this requirement is not compatible with obtaining the maximum output frequency in accordance with Equation 5. For this reason, transistors 95 and 96 are added as emitter-followers driving resistors 90 and 91 respectively. By this means, resistors 90 and 91 can be low in value so that the charging time of timing capacitors 92 and 93 can be materially reduced. In addition, the charging of capacitors 92 and 93 will be effectively clamped so that the charging time is further reduced and the non-linearity thereof is at least partially reduced. Thus the upper limit of operating frequencies has been raised without sacrificing the lower limit.

To prevent variations in the potential supplied by power supply $E_b$ from adversely affecting circuit operation, diode 97 which is preferably a Zener diode is supplied with regulator current through resistor 94 and is A.C. by-passed by capacitor 98. The voltage developed by diode 97 is then coupled to the collectors of transistors 71 and 72 by means of diodes 88 and 89 which, in turn, clamp the collector swing at the desired reference value. By this means, the value of the reference voltage from diode 97 is effectively substituted in the foregoing equations for the term $E_b$ thereby ensuing that the only variable will be $E_{in}$. A secondary effect is also realized, however, since timing capacitors 92 and 93 are now clamped at a lower voltage thereby allowing faster charging and higher output frequencies.

One circuit actually constructed and successfully operated in accordance with FIGURE 4 was found to operate over a range of 70:1 with a linearity of ±1%. For this oscillator, input voltages of .5 volt through 35 volts produced output frequencies ranging from 50 c.p.s. to 3500 c.p.s. For most of the previously mentioned applications, these characteristics are completely satisfactory and the input voltage was not increased further during testing merely because of power limitations of the transistors used. The circuit mentioned as being built and successfully operated in accordance with FIGURE 4 used a supply voltage, $E_b$ of +20 volts and the following circuit parameters:

| | |
|---|---|
| **71, 72** | 2N396 (General Electric). |
| **73, 74** | HD6135 (Hughes). |
| **75** | SG22 (Transitron). |
| **76, 77** | 10K ohms. |
| **81, 82, 94** | 4.7K ohms. |
| **83, 84** | 2N335 (General Electric). |
| **86, 87** | 22K ohms. |
| **88, 89** | 1N198 (Hughes). |
| **90, 91** | 1K ohms. |
| **92, 93** | .047 mfd. |
| **95, 96** | 2N167 (General Electric). |
| **97** | SV–916 (Transitron). |
| **98** | .1 mfd. |

The elements used in the circuits of this invention are relatively simple and are capable of being controlled with precision. Even the transistors are used in a configuration which results in a reasonably precise control of the characteristics thereof. In addition, it should be noted that the conduction characteristics of all of the transistors shown in any one embodiment could be reversed providing the polarity of the power supply was also reversed and thus provide a capability for handling positive input voltages.

FIGURE 5 is a circuit configuration advantageously utilizing voltage-controlled oscillators such as those described in detail hereinbefore whereby one analogue quantity may be divided arithmetically by another analogue quantity. That is to say, the circuit of FIGURE 5 produces a digital output that is directly related to the arithmetic ratio between two analogue input voltages.

In particular, two analogue voltages $E_1$ and $E_2$ the ratio of which $(E_1/E_2)$ is to be found are introduced to voltage controlled oscillators 101 and 102 respectively. Oscillators 101 and 102 then convert analogue quantities $E_1$ and $E_2$ into output pulse trains $F_{01}$ and $F_{02}$ respectively, each output signal having a frequency proportional to the analogue input quantity associated therewith. Mathematically:

$$F_{01}=K_1E_1$$

and:

$$F_{02}=K_2E_2$$

where $K_1$ and $K_2$ are unit constants in pulses per second per volt as determined by the circuit parameters of oscillators 101 and 102 respectively.

Signal $F_{01}$ is coupled into summary binary counter 104 through inhibitor circuit 107 which is designed to initially pass signal $F_{01}$ while similarly signal $F_{02}$ is coupled into gating binary counter 105 through inhibitor circuit 108. Each of the counters 104 and 105 comprise serially connected binary stages which are initially set to zero and which begin counting signals $F_{01}$ and $F_{02}$ when said signals are introduced thereto. When the gating counter 105 has counted a given number (P) of pulses, the final binary counting stage thereof will attain a "1" condition at which time counter 105 produces an output signal that is introduced to both of inhibitors 107 and 108 which are turned "off" thereby blocking signals $F_{01}$ and $F_{02}$ so that counters 104 and 105 will stop counting. At this point the operation is complete. Thus the time interval (T) required to fill the gating counter 105 is also the time during which summing counter 104 will count the pulses from signal $F_{01}$, and the number of pulses (N) counted by the summing counter 104 is directly proportional to the ratio $E_1/E_2$.

Expressed mathematically:

$$T=\frac{P}{F_{02}}=\frac{P}{K_2E_2}$$

where: T is the counting period for the gating counter 105 and:

$$N=TF_{01}=\frac{P}{K_2E_2}F_{01}=P\times\frac{K_1}{K_2}\times\frac{E_1}{E_2}$$

thus:

$$\frac{E_1}{E_2}=\frac{K_2}{K_1}\times\frac{N}{P}$$

Since P is known, the value of N can be seen to yield a direct indication of the analogue ratio $E_1/E_2$. The count N of course can be stored in summing counter 104 until read-out or it can be used in an external system, and the system can be reset and the counting operation recycled at whatever rate might be desirable.

It should be noted that the operation of all the stages of the divider system is digital with the exception of the oscillators and can be considered as having no error in operation. The accuracy of the system is thus limited only by the linearity and stability of the voltage controlled oscillators. However, one divider system actually constructed and successfully operated using the circuit configuration and components hereinbefore described and listed for FIGURE 4 for the oscillator stages was found to have an overall error of less than ±1%. This is quite superior to many prior art dividers such as phantastron dividers wherein the parameters of a vacuum tube were quite critical thereby producing typical errors greater than ±5%.

It is to be understood that the numerical value of P is arbitrary and is selected to fit each particular application although it should also be noted that the larger P is made, the more pulses will be counted in the numerator of the $E_1/E_2$ ratio thereby resulting in relatively greater accuracy. The maximum value of P is limited by the practical capacity of the gating counter and the length of time available for the calculation.

FIGURE 6 reveals a typical circuit configuration for implementing inhibitor stages 107 and 108 of FIGURE 5, and the operation of the circuitry of FIGURE 6 is well understood by those having normal skill in the art. Therefore a detailed description of the operation of this circuit will be omitted although the component parameters of a circuit in accordance with FIGURE 6 that was utilized in the system actually constructed and successfully operated were:

| Component: | Value or type |
|---|---|
| **111, 112** | .001 mmfd. |
| **114, 115** | 1N625. |
| **116, 117** | 10K ohms. |
| **118, 119** | 1K ohms. |

Although this invention has been shown and described herein with particularity, it is to be understood that the invention is not limited to the exact form or use indicated and that variations may be made in the particular design and configuration without departing from the scope and spirit of this invention.

What is claimed is:

1. A voltage-controlled oscillator comprising, a first semi-conducting oscillator device and a second semi-conducting oscillator device, said oscillator devices each having at least a base electrode, an emitter electrode, and a collector electrode, said emitter electrodes being connected to a common voltage reference, a pair of timing capacitors each interconnecting the collector electrode of a respective said oscillator device with the base electrode of the other said oscillator device so as to effect multivibrator action therewith, an energy source coupled to supply power to said collector electrodes of said oscillator devices, a pair of semi-conducting timing control devices having current conduction characteristics opposite said oscillator devices. said timing control devices each having at least a base electrode, an emitter electrode, and a collector electrode, said base electrodes of said timing control devices being connected to the common voltage reference, the collector electrodes of said timing control devices each being connected to a respective one of said base electrodes of said oscillator devices so as to present a constant current discharge path for said timing capacitor associated therewith, and input circuit means coupled to introduce input signals between the emitter electrodes of said timing control devices and said common voltage reference, said input signals being of the proper polarity to maintain said timing control devices in conduction, whereby said oscillator devices and circuitry associated therewith will produce relaxation oscillations, the frequency of said relaxation oscillations being substantially linearly related to said input signals.

2. A voltage-controlled oscillator in accordance with claim 1 in which said semi-conducting devices are transistors.

3. A voltage-controlled oscillator according to claim 2 in which the input circuit means is a resistive element connected between the input signal source and the junction of said emitter electrodes of said timing control devices so as to convert input voltages into input currents.

4. A voltage-controlled oscillator according to claim 2 which includes a pair of unidirectional conducting means connected to prevent the flow of drift current between the bases of said oscillator transistors and the collectors of said timing control transistors, and a pair of coupling means for providing a shunt path for the drift currents present at the base electrodes of said oscillator transistors.

5. A voltage-controlled oscillator in accordance with claim 2 which includes means for clamping the collector swing of said oscillator transistors at a reference voltage level.

6. A voltage-controlled oscillator comprising, a first oscillator transistor and a second oscillator transistor each having at least a base electrode, an emitter electrode, and a collector electrode, said collector electrodes each being resistively connected to a common voltage reference, an energy source connected on one side to the common voltage reference and resistively connected on the other side to each of said base electrodes so as to present a shunt path for leakage currents, unidirectional conducting means commonly connected between said energy source and said emitter electrodes both to provide inverse biasing and to complete the emitter-collector circuit for said oscillator transistors, a first control transistor and a second control transistor having current conducting characteristics opposite said oscillator transistors and each having at least a base electrode, an emitter electrode, and a collector electrode, said base electrodes of said control transistors being connected to said common voltage reference so that said emitter electrodes are maintained at the potential thereof, input circuit means for resistively coupling common input signals between said common voltage reference and the emitter electrodes of said control transistors so as to provide forward biasing therefor, a first unidirectional conducting device connected between said collector electrode of said first control transistor and said base electrode of said first oscillator transistor, a second unidirectional conducting device connected between said collector electrode of said second control transistor and said base electrode of said second oscillator transistor, said unidirectional conducting devices being connected so as to prevent leakage current flow between the said base and collector electrodes associated therewith, a first impedance matching transistor and a second impedance matching transistor having the same current conducting characteristics as said control transistors and each having at least a base electrode, an emitter electrode, and a collector electrode, said collector electrodes of said impedance matching transistors being connected to said source of energy, said emitter electrodes of said impedance matching transistors being resistively connected to said common voltage reference, said base electrodes of said first impedance matching transistor being connected to said collector electrode of said first oscillator transistor, said base electrode of said second impedance matching transistor being connected to said collector electrode of said second oscillator transistor, a high apparent impedance thereby being presented to said collector electrode of said oscillator transistors, a first timing capacitor connected between said emitter electrode of said first impedance matching transistor and said collector electrode of said second control transistor, a second timing capacitor connected between said emitter electrode of said second impedance matching transistor and said collector electrode of said first control transistor, said timing capacitors thereby controlling the bias at said base electrodes of said oscillator transistors so as to produce multivibrator action therewith, and fixed potential circuit means of a voltage between said reference voltage and the voltage of said energy source connected by unidirectional conducting devices to said collector electrodes of said oscillator transistors so as to prevent charging of said timing capacitors to the full potential of said energy source thereby maintaining said oscillator action independent of variations of the potential at said energy source, whereby said oscillations will be directly controlled by and linearly related to said input voltages.

7. A voltage-controlled oscillator in accordance with claim 6 in which said input circuit means include a pair of resistive elements each connected between a common input terminal and a respective emitter electrode of one of said control transistors so that the collector current flow of both of said control transistors will be substantially equal.

8. A voltage-controlled oscillator in accordance with claim 7 in which said oscillator transistors are PNP type transistors, and said control and impedance matching transistors are NPN transistors.

9. A voltage-controlled oscillator comprising first and second oscillator transistors of a first conductivity type, first and second control transistors of a second conductivity type opposite said first conductivity type, each of said transistors having at least base, emitter and collecor electrodes, circuit means constructed and arranged for operationally completing the emitter-collector circuits of said oscillator transistors and including at least one power source, capacitive feedback circuit means interconnecting the said collector and base electrodes of said oscillator transistors for maintaining multivibrator oscillations therebetween, said control transistors having the base electrodes thereof connected to a common voltage reference and having the collector electrodes thereof coupled to respective base electrodes of said oscillator transistors, and input circuit means constructed and arranged for introducing input signals between the emitter electrodes of said control transistors and said common voltage reference so that the discharge of said capacitive feedback circuit means will be linearly proportioned to the magnitude of the input signal, whereby the frequency of the oscillations between said oscillator transistors will be in direct linear proportion to the input signal.

10. A voltage controlled oscillator in accordance with claim 9 which includes first and second impedance matching transistors of said second conductivity type, said capacitive feedback circuit means including the base-emitter circuits of said impedance matching transistors for providing interconnection of the collector electrodes of respective ones of said oscillator transistors with the base electrode of the other of said oscillator transistors so as to present a lower resistance charge path for said capacitive feedback circuit means, and means for coupling operating power to said impedance matching transistors.

11. A voltage-controlled oscillator in accordance with claim 9 including further a first unidirectional conducting device connected between said collector electrode of said first control transistor and said base electrode of said first oscillator transistor, and a second unidirectional conducting device connected between said collector electrode of said second control transistor and said base electrode of said second oscillator transistor, said unidirectional conducting devices being connected so as to prevent leakage current flow between said base and collector electrodes associated therewith.

References Cited by the Examiner

UNITED STATES PATENTS

| | | | |
|---|---|---|---|
| 2,750,502 | 6/56 | Gray | 332—14 X |
| 2,826,741 | 3/58 | Cook | 332—14 |
| 2,874,315 | 2/59 | Reichert | 307—88.5 |
| 2,924,788 | 2/60 | Mauruschat | 332—14 |
| 2,946,897 | 7/60 | Mayo | 307—88.5 |
| 2,981,850 | 4/61 | Hoskinson | 307—88.5 |
| 3,010,078 | 11/61 | Stefanov | 332—14 X |
| 3,013,220 | 12/61 | Norris | 332—14 X |

ROY LAKE, *Primary Examiner.*

GEORGE N. WESTBY, ROBERT H. ROSE, ALFRED L. BRODY, *Examiners.*